E. C. BASS.
GUN CAMERA.
APPLICATION FILED APR. 29, 1918.

1,345,981.

Patented July 6, 1920.
5 SHEETS—SHEET 1.

WITNESSES

INVENTOR
E. C. Bass
BY
ATTORNEYS

E. C. BASS.
GUN CAMERA.
APPLICATION FILED APR. 29, 1918.

1,345,981.

Patented July 6, 1920.
5 SHEETS—SHEET 3.

WITNESSES

INVENTOR
E. C. Bass
BY
ATTORNEYS

E. C. BASS.
GUN CAMERA.
APPLICATION FILED APR. 29, 1918.

1,345,981. Patented July 6, 1920.
5 SHEETS—SHEET 5.

WITNESSES
INVENTOR
E. C. Bass,
BY
ATTORNEYS

UNITED STATES PATENT OFFICE.

ERNEST C. BASS, OF NEW YORK, N. Y.

GUN-CAMERA.

1,345,981.  Specification of Letters Patent.  Patented July 6, 1920.

Application filed April 29, 1918. Serial No. 231,491.

*To all whom it may concern:*

Be it known that I, ERNEST C. BASS, a subject of the King of Great Britain, and a resident of the city of New York, borough of Manhattan, in the county and State of New York, have invented a new and Improved Gun-Camera, of which the following is a full, clear, and exact description.

The object of the invention is to provide a new and improved camera more especially designed for use on aeroplanes employed in training aviation scholars to the art of aerial warfare on aviation fields with a view to record imaginary hits by photographs of the adversary. Another object is to permit the aviator to handle the camera similar to a gun to permit of taking accurate aim of the adversary. Another object is to enable the user to take a series of desired successive pictures at any predetermined speed on holding a trigger pressed, or to take pictures singly on alternately pressing and releasing a trigger. Another object is to permit of rapidly positioning the camera for quickly obtaining pictures of moving or of fixed objects, landscapes or the like.

With these and other objects in view, the invention consists of novel features of construction hereinafter shown and described and then specifically pointed out in the claims.

A practical embodiment of the invention is represented in the accompanying drawings forming a part of this specification, in which similar characters of reference indicate corresponding parts in all the views.

The frame of the casing 10 is in the form of a rapid fire gun and is provided at its under side with a bracket 11 carrying a transverse pivot 12 journaled in the head 13 of a vertical pin 14 mounted to turn in a bearing 15 attached to a suitable part of an aeroplane on which the gun camera is to be used. By the arrangement described a universal joint connection is had between the support 15 and the frame or casing 10 to allow of swinging the latter sidewise or up or down with a view to obtain proper photographs of another aeroplane or other part, as hereinafter more fully explained. The front of the frame or casing 10 is in the form of a tube or barrel 20 carrying a front sight 21, and on the rear end of the casing 10 is secured a stock 22 terminating in a handle 23 and provided with a rear sight 24 to be used in conjunction with the front sight 21 to obtain proper aim at another aeroplane or other object to be photographed. The stock 22 is also provided at the under side with a depending handle 25 and with a trigger guard 26 containing a trigger 27 adapted to be taken hold of by the operator for controlling the mechanism used for actuating the shutter and the film feed device of a film camera 30 of any approved construction and mounted in the forward portion of the casing 10 and with the objective 31 of the camera 30 extending centrally within the tube 20 of the frame or casing 10. The objective 31 is provided with the usual stop 32 having an actuating member extending through a slot 33 in the tube 20 to permit the operator in charge of the camera to select a desired stop.

Figure 3:
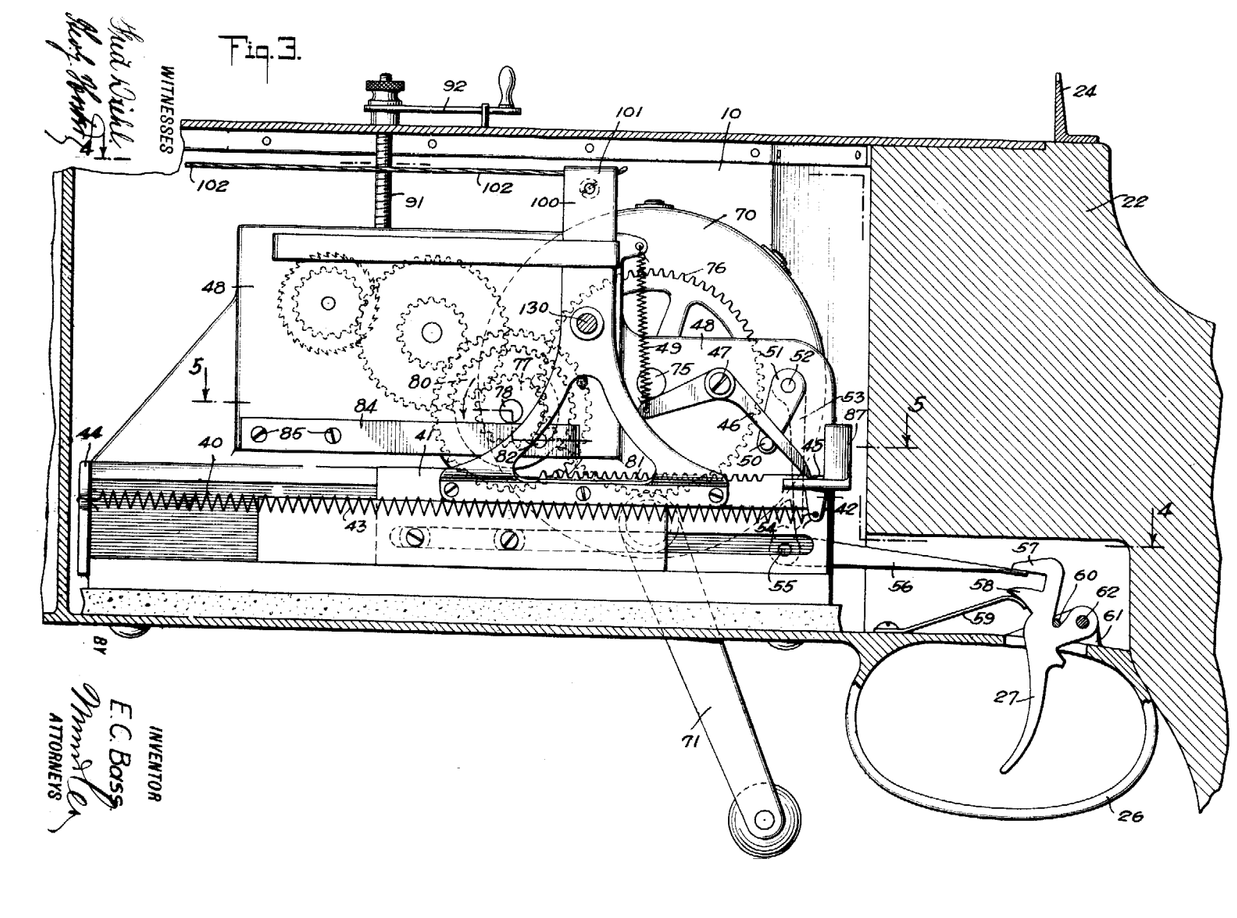
Fig. 3 is an enlarged sectional side elevation of the trigger controlled operating mechanism.
Figure 4:
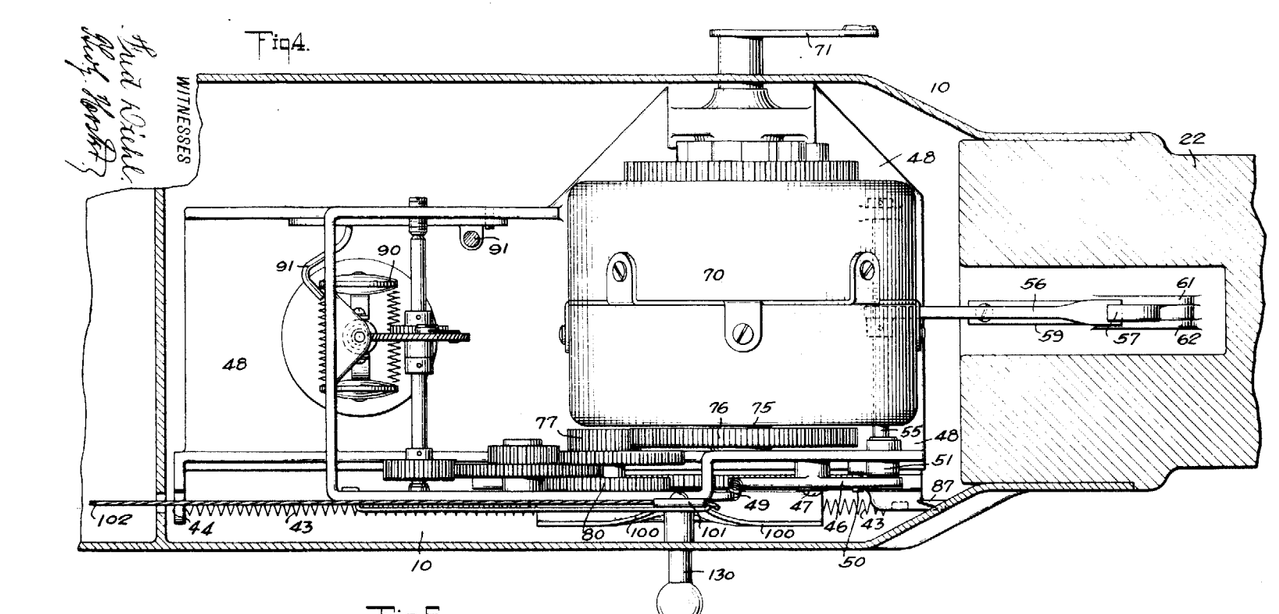
Fig. 4 is a sectional plan view of the same on the line 4—4 of Fig. 3.
Figure 5:
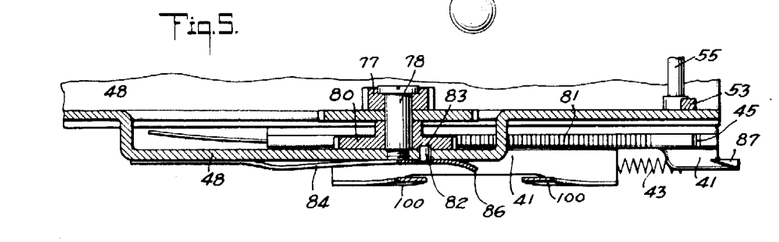
Fig. 5 is a sectional plan view of the same on the line 5—5 of Fig. 3.
Figures 6, 7, 8, 9:
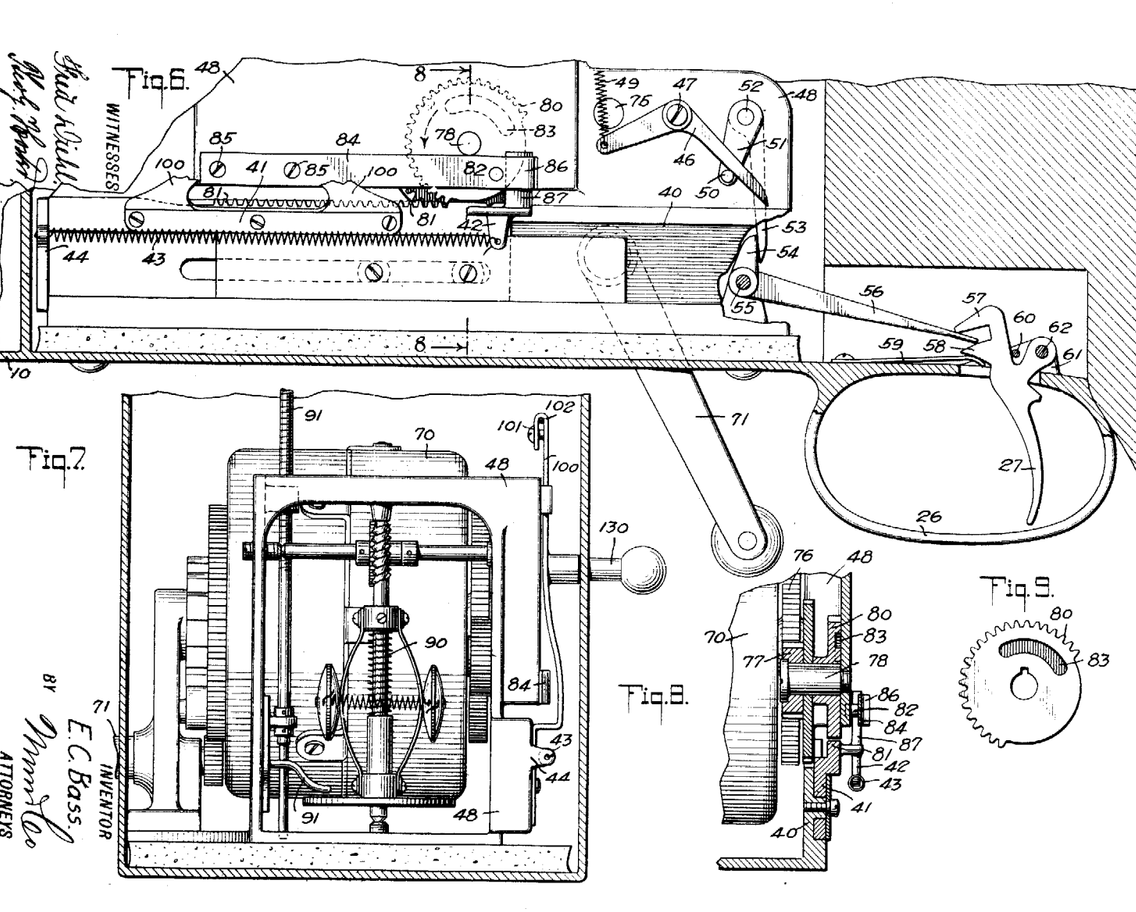
Fig. 6 is a sectional side elevation of the same with the parts in position when the trigger is pressed.
Fig. 7 is a front end elevation of the same with the casing shown in cross section.
Fig. 8 is a cross section of the same on the line 8—8 of Fig. 6.
Fig. 9 is a face view of the mutilated gear wheel for intermittently connecting the motor with the slide.

Within the casing 10 is arranged a guideway 40 on which is mounted to slide forward and backward a slide 41 provided at the rear end with a bracket 42 on which is secured the rear end of a spring 43 extending forwardly and attached at its forward end to a bracket 44 forming part of the guideway 40. The spring 43 serves to impart a forward sliding movement to the slide 41 whenever the latter is released by the operator pressing the trigger 27, as hereinafter more fully explained. The slide 41 is provided near its rear end with a notch 45 engaged by a retaining lever 46 fulcrumed at 47 on a framework 48 attached to or forming part of the guideway 40. The lever 46 is pressed on by a spring 49 attached to the framework 48, and the said lever 46 normally holds the slide 41 locked in rearmost position, as plainly shown in Fig. 3. The retaining lever 46 is engaged by a pin 50 held on an arm 51 secured to a transverse shaft 52 journaled on the framework 48, and on the shaft 52 is secured an arm 53 engaged at its free end by an arm 54 secured on a transverse shaft 55 journaled in suitable bearings arranged on the framework 48. On the shaft 55 is secured a rearwardly extending arm 56 engaged by the upper hook end 57 of the trigger 27 previously mentioned. The trigger 27 is provided with a lug 58 pressed on by a spring 59 attached to the trigger guard 26. The return movement of the trigger 27 is limited by a stop pin 60 mounted on a projection 61 forming part of the trigger guard 26 and on which the trigger 27 is pivoted at 62, as indicated in Figs. 3 and 6. Normally the trigger is in the position shown in Fig. 3, and the slide 41 is held locked in rearmost position by the retaining lever 46 engaging the notch 45. Now when it is desired to release the slide 41 and to allow the same to move forward by the action of its spring 43 then the operator presses the trigger 27 whereby a swinging movement is given to the arm 56 to turn the shaft 55 which by the arm 54 imparts a swinging motion to the arm 53 to turn the shaft 52 which by the arm 51 and its pin 50 swings the retaining lever 46 upward out of engagement with the notch 45 to release the slide 41.

A return sliding movement is given to the slide 41, preferably by the use of a motor 70, mounted in the casing 10 on the framework 48, and this motor 70 may be of any approved construction, for instance, as shown, the motor 70 is of the spring type, such as is generally used in phonographic and similar machines, and its spring is wound up by the operator manipulating a handle 71 extending on the right-hand side of the casing 10 of the gun camera so as to be within convenient reach of the operator to rewind the spring of the motor 70 whenever necessary. On the driven shaft 75 of the motor 70 is secured a gear wheel 76 in mesh with a pinion 77 secured on a transverse shaft 78 journaled on the framework 48. On the shaft 78 is secured a mutilated gear wheel 80 adapted to mesh with a rack 81 secured to or forming part of the slide 41. When the slide 41 is in rearmost position, as shown in Fig. 3, then the mutilated gear wheel 80 is out of mesh with the rack 81. Normally the mutilated gear wheel is locked in this position by a locking pin 82 engaging a segmental recess 83 formed in one face of the mutilated gear wheel 80, as plainly indicated in Figs. 8 and 9. The pin 82 is mounted on the free end of a spring 84 attached at its forward end by screws 85 or other means to the framework 48, and the rear free end 86 of the spring 84 is slightly curved outward and adapted to be engaged by a wedge 87 attached to or forming part of the rear end of the slide 41 to swing the spring 84 sidewise with a view to withdraw the pin 82 from the recess 83 to release the mutilated gear wheel 80 at the time the slide 41 moves into forward position. When this takes place the mutilated gear wheel 80 is rotated from the motor 70 by the pinion 77 and the gear wheel 76 above described whereby the mutilated gear wheel moves into mesh with the rack 81 and pushes the same and consequently the slide 41 rearward to normal position in which the slide 41 is locked by the lever 46 reëngaging the notch 45 provided the trigger 27 is released. It will be noticed that during this return movement of the slide 41 the wedge 87 moves out of engagement with the free end 86 of the spring 84 thus allowing the pin 82 to reëngage the recess 83 and hold the mutilated gear wheel 80 against rotation until again released by the next forward action of the slide 41, as above described. It is understood that when the pin 82 is in engagement with one end of the recess 83, the shaft 75 of the motor 70 is held locked against running by the pinion 77 and the gear wheel 76. It will be noticed that in case the trigger 27 is kept pressed a continuous reciprocating movement is given to the slide 41, that is, the slide is moved forward by the action of the spring 43 and returned by the action of the motor 70 by way of the mutilated gear wheel 80 and rack 81.

The speed of the motor 70 is controlled by the usual governor 90 provided with a brake mechanism 91 under the control of the operator who takes hold of a handle 92 forming part of said mechanism and located on the top of the casing 10 to be within convenient reach of the operator. As the brake mechanism 91 and the governor 90 are of usual construction, further description of the same is not deemed necessary, it being sufficient to state that the operator on turning the handle 92 can vary the speed of the governor 70 to cause a more or less rapid return movement of the slide 41 as desired by the operator.

Figure 10:
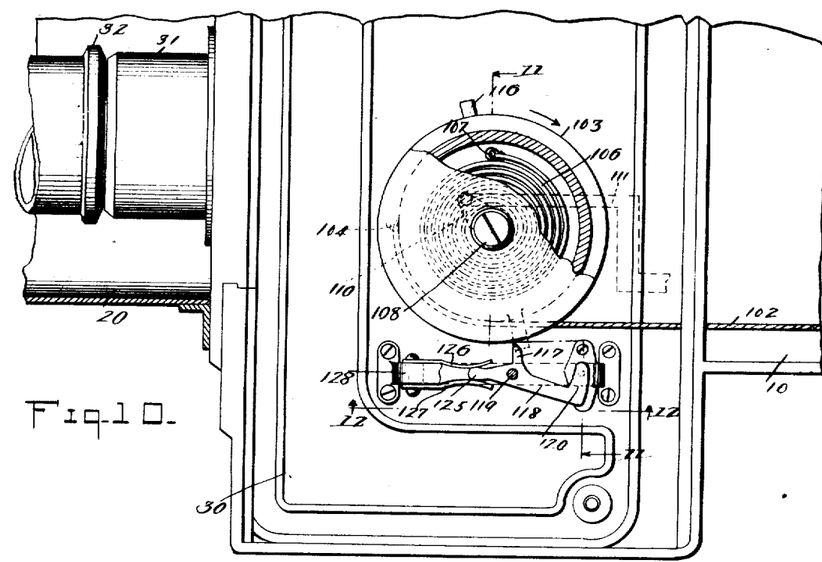
Fig. 10 is an enlarged plan view of a portion of the camera with the cover removed and parts shown in section.
Figure 11:
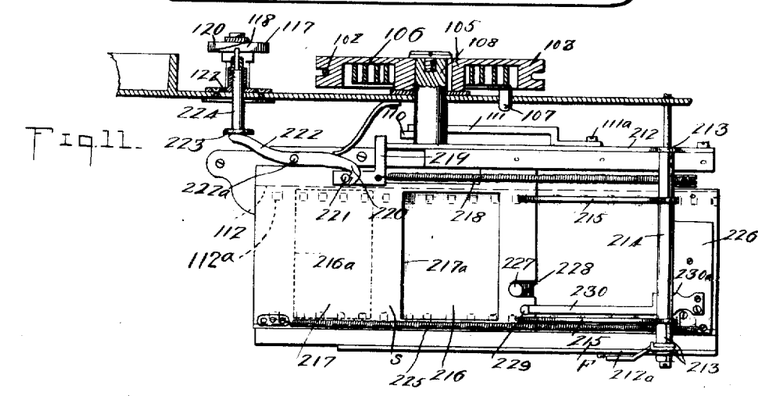
Fig. 11 is a cross section of the same on the line 11—11 of Fig. 10.
Figure 12:
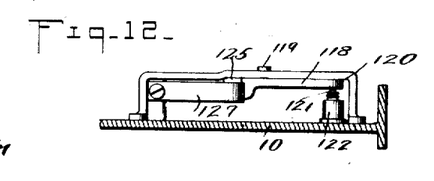
Fig. 12 is a sectional side elevation of the same on the line 12—12 of Fig. 10.

Referring to Figs. 10, 11, and 12, I have here shown the form of shutter-actuating and film-feeding mechanism shown in Patent No. 1,091,814 which is adapted to be controlled by the apparatus just described through the medium of a cord or similar flexible connection 102, which, as shown in Fig. 3 is connected at one end to an upwardly extending bracket 100 by a clamp or other suitable fastening means 101. The bracket 100 is secured to the slide 41 so that the cord 102 moves with the slide. As shown in Fig. 10, the opposite end of the cord 102 is wound around a drum 103 and is secured thereto at the point 104. On the hub 105 of the drum 103 is secured the inner end of a coil spring 106 fastened at its outer end on a pin 107 attached to the casing 10, as clearly shown in Fig. 11. The hub 105 is keyed to a shaft 108 mounted to turn in suitable bearings in the top of the camera 30. The shaft 108 is provided with an arm 110 which is connected with a link 111, which latter is in turn pivotally connected as at 111ᵃ to a rod 212. The rod 212 is mounted for longitudinal and sliding movement on the upper edge of a frame generally indicated at F, while arranged upon the lower edge of the frame F is another longitudinally slidable rod 212ᵃ. These rods 212 and 212ᵃ are provided at corresponding points with ears 213 in which is journaled a shaft 214. The shaft 214 carries a pair of pawls 215 which are adapted to engage the feed apertures 112ᵃ of the film 112 when the shaft 214 is moved to the right from the position shown in Fig. 11. This movement of the shaft 214 is effected through the spring 106 acting on the shaft 108 and moving the rod 212 through the arm 110 and link 111, as will be understood.

Mounted for longitudinal sliding movement within the frame F is a shutter, designated generally at S and which comprises, in the present instance, a pair of movable sections 216 and 217, each of which is provided with a rectangular opening 216ᵃ and 217ᵃ, respectively, which are adapted to register with each other and with a similar opening (not shown), formed in the frame F for effecting an exposure of a portion of the film 112. The shutter section 216 is biased to the right from the position shown in Fig. 11, by means of a coiled spring 218, one end of which is fixed to the frame F, while its opposite end is connected to an L-shaped bar 219 fixed to the shutter section 216. The shutter section 216 is normally maintained in the position shown in Fig. 11, which is the left hand extreme position, by means of a hook 220 engaging a lug 221 formed on the bar 219. The hook 220 is formed on one end of a lever 222 which is fulcrumed at 222ᵃ, while the opposite end of such lever is extended upwardly and engages a head 223 formed on the end of a vertically disposed rod 224. The rod 224 has a sliding fit within the upper wall of the casing 10, with its upper end disposed directly below a wedge-shaped cam 120 formed on one end of a lever 118. The lever 118 is fulcrumed at 119 and its opposite end 125 is disposed between springs 126 and 127, which springs are secured to the opposite sides of a block 128, and arranged to normally bias the lever 118 so that the cam 120 does not engage the rod 224. Adjacent the pivot 119 the lever 118 is formed with a finger 117 which is adapted to be engaged by a finger 116 formed on the drum 103 to effect a rocking movement of the lever and to thereby move the cam 120 to effect a depression of the rod 224. When the rod 224 is depressed the lever 222 is rocked so as to cause the hook 220 to disengage the lug 221. With the hook 220 in disengaged position, the shutter section 216 would naturally move to the extreme right hand position under the action of the spring 218, but in order to prevent this movement at this particular time, the rod 212 is arranged so that one end thereof abuts the bar 219. With the bar 212 locked against movement by virtue of the spring 106 acting on the shaft 108, it will be clear that in its normal position, the shutter 216 is held against movement by the bar 212.

The shutter section 217 also occupies a normal position similar to the normal position of the shutter section 216, as shown in Fig. 11, wherein both of such sections are disposed at the extreme left hand end of the frame F. The shutter section 217 is biased toward the right hand end of the frame F by a spring 225, one end of which is connected to the left hand end of the shutter section while its opposite end is connected to a plate 226 secured to the frame F. The shutter section 217 is held in its normal position against the action of the spring 225 by a pin 227 fixed to the shutter section 216 and working within a slot 228 formed in the shutter section 217. For causing a delayed movement of the shutter section 217, that is, a movement subsequent to the movement of the shutter section 216, I provide a lug 229, and a leaf spring 230, which, when in its normal position, is adapted to engage the lug for preventing the movement of the shutter section 217. The spring 230 is provided with a lateral extension 230ᵃ which is disposed in the path of movement of the pin 227 so that when the shutter section 216 is released, the lug engages the spring extension as it moves into its final position, thereby moving the spring and drawing the same out of engagement with the lug 229. During the movement of the shutter section 216, it will be understood that the pin 227 when removed from the slot 228 releases the shutter section 217, but such shutter is still held against movement by the lug 229 engaging the spring 230 so that, in reality, the shutter section 217 is not released until the spring 230 is moved by the pin 227.

From the foregoing construction the operation of the shutter and film-feeding mechanism may be briefly described as follows:

When the shaft 108 is oscillated in the direction of the arrow, Fig. 10, the finger 116 is moved from the position shown in solid lines in said Fig. 10 to the position shown in dash lines. During this movement the link 111 moves the bar 212 to the right and carries with it the shaft 214 and the pawls 215, the pawls engaging the feed apertures in the film 112 and thus moving the latter to the right. Immediately upon the completion of this film-feeding operation the finger 116 engages the finger 117 and thereby rocks the lever 118 to depress the shaft 224 which moves the hook 220 into releasing position. As the bar 212 in its right hand extreme position no longer engages the bar 219, it will be obvious that as soon as the hook 220 is moved to released position the spring 218 immediately moves the shutter section 216 to the right. As the shutter 216 reaches its final right hand extreme position, the shutter section 217 is released, and in practice the movement of these two shutter sections occurs almost simultaneously. Because of the arrangement of the openings 216$^a$ and 217$^a$, the shutter sections, when moving to the right hand extreme position in the manner just described permit the exposure of the film, since the openings register for a predetermined interval with each other and with the opening in the frame F, during which time a section of the film 112 is exposed and the picture is taken.

During the return movement of the drum 103 to its normal position, the shaft 108 is, of course, rotated in the opposite direction to that previously described, wherein the rod 212 moves into its normal position again engaging the bar 219 and returning the shutter section 216 to its normal position. With the movement of the rod 212, the shaft 214 is also returned to its normal position, but because of the disposition of the pawls 215, they do not engage the feed apertures 216 but merely glide over the same so that the film remains at rest. In the normal position of the shutter section 216, it will be understood that the hook 220 again engages the pin 221 and thereby locks the shutter section against movement. During the return movement of the shutter section 216, the shutter section 217 is also returned to its normal position by virtue of the pin 227 engaging the inner end of the slot 228. It is clear that the shutter sections are held in normal position by reason of a constant pull being exerted upon the cord 102 to prevent the spring 106 unwinding.

From the foregoing operation of the shutter actuating and film-feeding mechanism it will be clear that when the slide 41 moves forward, the flexible connection 102 is slackened to allow the drum 103 to rotate under the action of the spring 106, and when the slide is returned to its rearmost position by the motor 70, a pull is exerted on the cord 102 thus returning the drum 103 to its normal position and again placing the spring 106 under tension. From this operation it will be seen that during the forward movement of the slide 41, the film-feeding mechanism is first actuated and the shutter-actuating mechanism subsequently actuated to effect an exposure of the film. During the return movement of the slide 41 the film-feeding mechanism and the shutter S are returned to their normal positions, the shutter sections moving together so as not to expose the film while the pawls 215 glide over the feed apertures so that the film remains at rest.

By the operator pressing and releasing the trigger 27 the shutter mechanism and the film feeding mechanism are both actuated once whereby a single exposure is made, but when the trigger is held pressed and the slide practically reciprocates continually then a series of pictures are taken successively and the speed of taking the pictures can be increased or diminished by the operator correspondingly manipulating the handle 92 of the speed controlling device for the motor 70.

Figure 1:
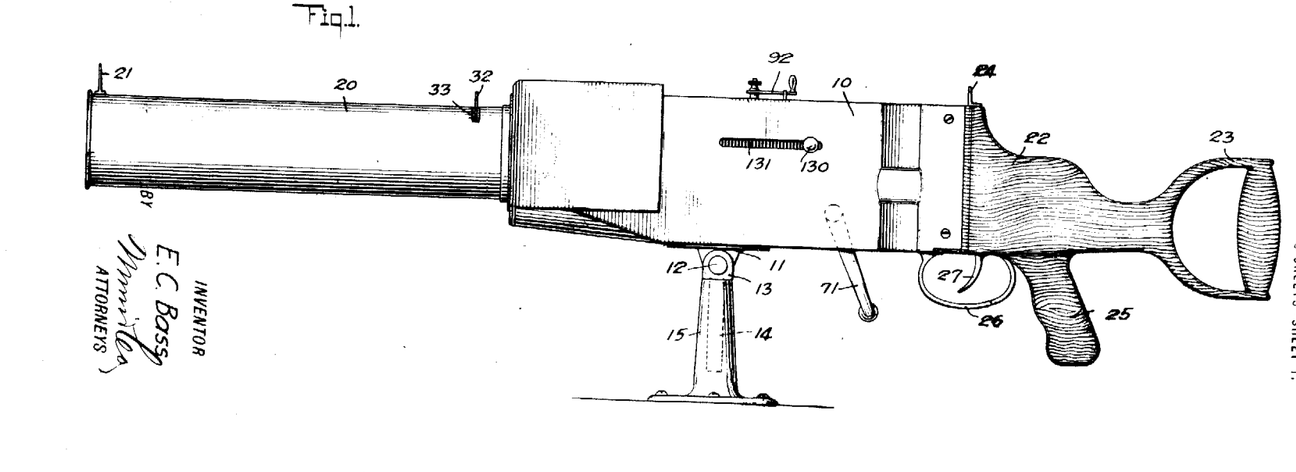
Figure 1 is a side elevation of the gun camera.
Figure 2:
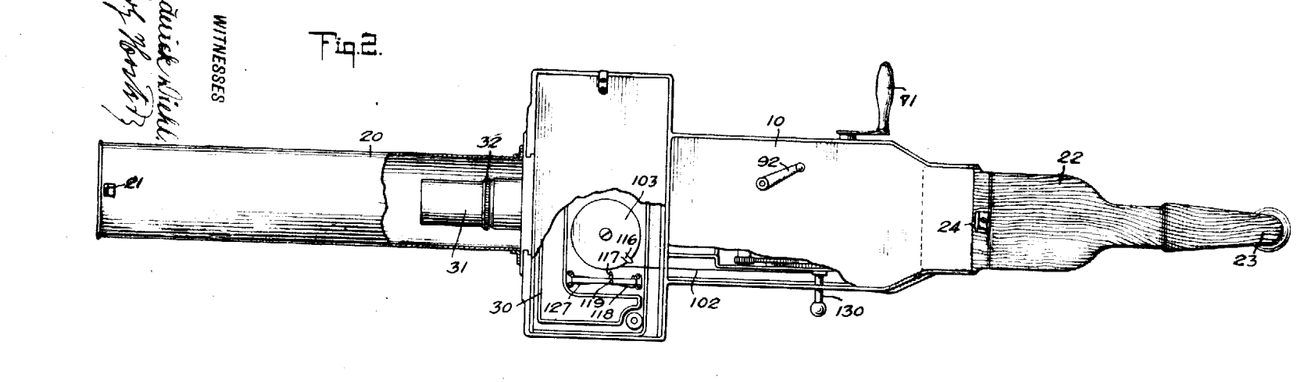
Fig. 2 is a plan view of the same with parts broken out.

The slide 41 can be manipulated by hand whenever it is desired to do so, and for this purpose the bracket 100 is provided with a handle 130 extending sidewise through a longitudinally extending slot 131 formed in the left-hand side of the casing 10, as plainly indicated in Fig. 1.

Presuming that the gun camera is mounted on an aeroplane and it is desired to take photographs, while in the air, of an adversary, then the operator takes hold of the gun camera and manipulates the same to obtain proper aim of the adversary by way of the sights 24, 21. As soon as the adversary is sighted the operator presses the trigger 27 to release the normally locked slide 41 whereby the spring 43 causes the slide to move forward thereby permitting the drum 103 to turn and actuate the shutter of the camera 30 whereby an exposure is made of the adversary. During this forward movement of the slide 41 the wedge 87 actuates the spring 84 whereby the pin 82 is withdrawn from the groove 83 of the mutilated gear wheel 80 to allow the motor to run and thereby cause a return of the slide 41. In case the operator has released the trigger 27 then the locking lever 46 reëngages the notch 45 of the slide at the time the latter returns to normal rearmost position thus holding the slide against further movement. In case the operator keeps the trigger 27 pressed then the lever 46 does not reëngage the notch 45 but at this time the mutilated gear wheel 80 moves out of mesh with the rack 81 so that the slide 41 is again moved forward by the action of its spring 43, and the above described operation is repeated.

In aviation work use is preferably made of cross hairs and targets which may be produced on the film 112 during its manufacture or may be produced thereon during an exposure by having such cross hairs and target mounted in the objective 31. By this arrangement the picture of the adversary can be readily located on the film and corresponding credit given to the correctness or incorrectness of the aim. It is evident that the picture appearing in the center of the film counts the same as a bull's eye, and the picture located more remote from the center counts correspondingly less. When keeping the trigger 27 pressed a large number of exposures can be made in a comparatively short time especially as the speed of the motor can be regulated by correspondingly manipulating the handle 92, as previously explained.

Having thus described my invention, I claim as new and desire to secure by Letters Patent:

1. In a gun camera, a camera proper having a shutter and a film feeding mechanism, a controlling and actuating device for the said shutter and film feeding mechanism, spring pressed means connected with the said controlling and actuating device, and a trigger controlled releasing device for the said means to release the latter on pressing the trigger, to allow the means to move by the action of its spring to actuate the said controlling and actuating device for manipulating the shutter to make an exposure.

2. In a gun camera, a camera proper having a shutter and a film feeding mechanism, a controlling and actuating device for the said shutter and film feeding mechanism, spring-pressed means connected with the said controlling and actuating device, a trigger controlled releasing device for the said means to release the latter on pressing the trigger to allow the means to move by the action of its spring to actuate the said controlling and actuating device for manipulating the shutter to make an exposure, a motor, and a connection between the said motor and the said means to return the latter and the controlling and actuating device to normal position.

3. In a gun camera, a controlling and actuating device for successively actuating the camera shutter and the film feeding mechanism, a spring-pressed slide connected with the said controlling and actuating device, a trigger controlled locking and releasing device for the said slide to hold the latter normally in position and to release the latter and allow its spring to move it in one direction, a motor, and a connection between the motor and the said slide to return the latter to normal position.

4. In a gun camera, a spring-pressed drum provided with means for actuating the camera shutter and the film feeding mechanism, a reciprocating slide, means for reciprocating the said slide, a flexible connection between the said slide and the said drum, and a trigger controlled locking and releasing device for the said slide to allow the slide to reciprocate intermittently on pressing and releasing the trigger, and to allow the slide to reciprocate continually on keeping the trigger pressed.

5. In a gun camera, a spring-pressed drum provided with means for actuating the camera shutter and the film feeding mechanism, a reciprocating slide, a flexible connection between the said slide and the said drum, a spring connected with the slide to move the latter in one direction, a motor connected with the slide to move the latter in the reverse direction, and a trigger controlled locking and releasing device for the said slide to allow the slide to reciprocate intermittently on pressing and releasing the trigger and to allow the slide to reciprocate continually on keeping the trigger pressed.

6. In a gun camera, a spring-pressed slide provided with a rack, a mutilated gear wheel normally out of mesh with the said rack and adapted to mesh with the said rack, a trigger controlled locking and releasing device for the said rack, a motor adapted to drive the said mutilated gear wheel, a locking and releasing device for the said mutilated gear wheel and controlled by the said rack, and a device connected with the said slide and controlling the camera shutter and the film feeding mechanism.

7. In a gun camera, a drum provided with a lug and with a crank arm, a spring rotating the drum in one direction, a reciprocating slide connected with the drum to rotate it in a reverse direction, a lever adapted to be actuated by the said lug and controlling the shutter of the camera, and a connection between the said crank and the film feeding mechanism to actuate the latter.

8. In a gun camera, a spring-pressed slide provided with a rack and a notch, a locking lever adapted to engage the said notch, a trigger mechanism controlling the said locking lever, a motor, a mutilated gear wheel driven from the said motor and adapted to mesh with the said rack, the said gear wheel having a recess, a spring provided with a locking and releasing pin engaging the said recess, and a wedge on the slide adapted to engage the said spring to withdraw the locking and releasing pin from the said recess.

9. In a gun camera, a casing provided at the forward end with a tube and at the rear with a stock having a handle, a camera mounted in the said casing and having its objective extending centrally in the said tube, front and rear sights, of which the front sight is mounted on the forward end of the tube and the rear sight is mounted on the stock, a controlling and actuating device for the shutter and film feed of the camera and mounted in the said casing, a spring-pressed slide mounted in the casing and connected with the said controlling and actuating device, a motor mounted in the casing, a gearing adapted to connect the motor with the said slide to move the latter in one direction against the tension of its spring, and a trigger controlled locking and releasing mechanism mounted on the said casing and connected with the said slide to lock or release the latter.

10. In a gun camera, a controlling and actuating device for successively actuating the camera shutter and the film feed, a slide connected with the said controlling and actuating device, operating means for reciprocating the said slide, and a trigger controlled locking and releasing mechanism for locking and releasing the slide.

ERNEST C. BASS